Feb. 15, 1949.  R. G. OLT  2,461,765
METHOD OF MAKING COMPOSITE BEARINGS
Filed July 10, 1943  2 Sheets-Sheet 1
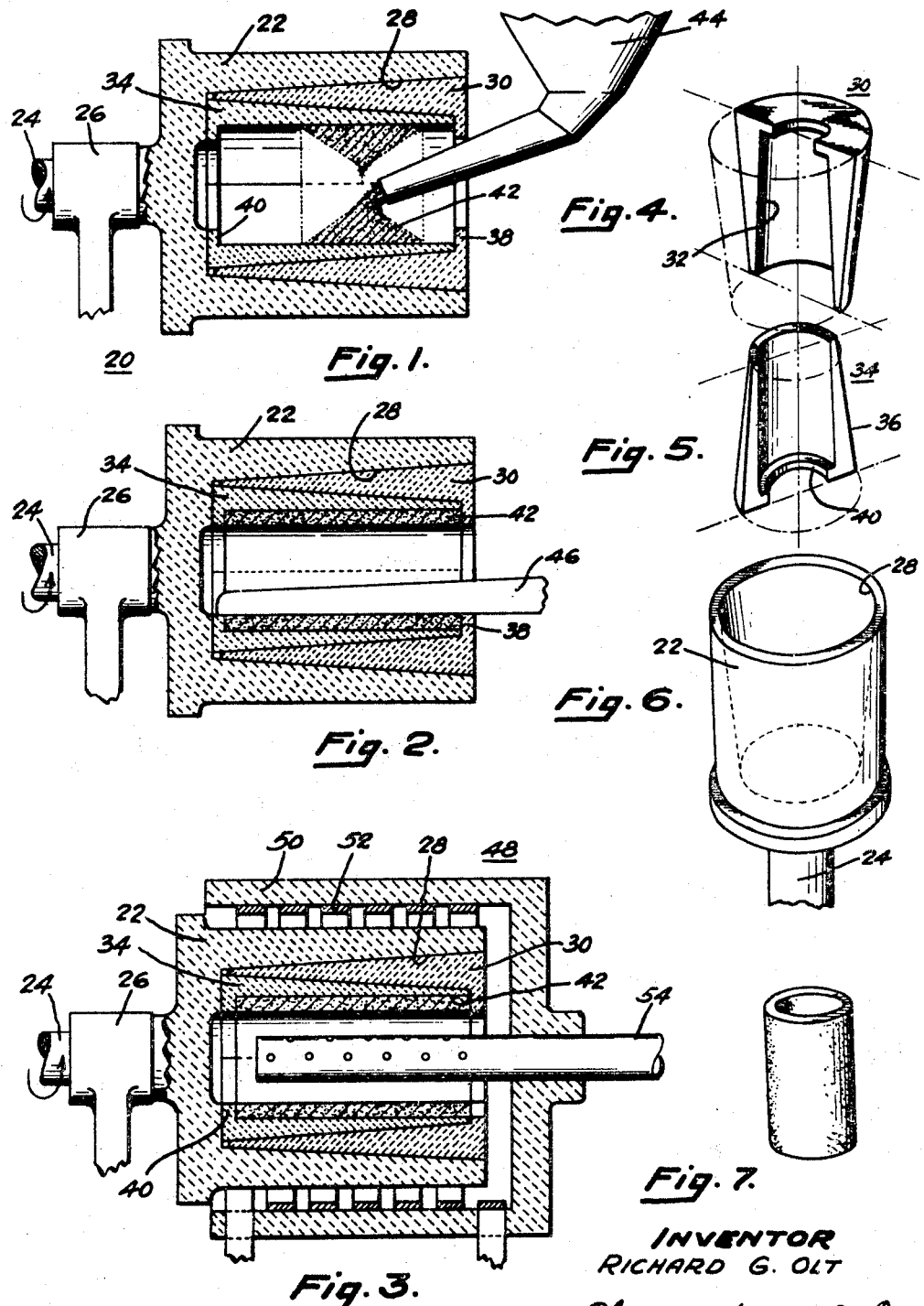
INVENTOR
RICHARD G. OLT
BY Spencer, Hardman & Febr
HIS ATTORNEYS Feb. 15, 1949.  R. G. OLT  2,461,765
METHOD OF MAKING COMPOSITE BEARINGS
Filed July 10, 1943  2 Sheets-Sheet 2

INVENTOR
RICHARD G. OLT
BY
HIS ATTORNEYS

Patented Feb. 15, 1949

2,461,765

UNITED STATES PATENT OFFICE 2,461,765

METHOD OF MAKING COMPOSITE BEARINGS

Richard G. Olt, Dayton, Ohio, assignor to General Motors Corporation, Detroit, Mich., a corporation of Delaware Application July 10, 1943, Serial No. 494,194

5 Claims. (Cl. 29—149.5)

This invention relates to a method and apparatus for forming porous metal articles, such as composite bearings, and is particularly concerned with methods and apparatus for centrifugally forming porous metal articles. This application is a continuation in part of my copending application, Serial No. 408,667, filed August 28, 1941, and now matured into Patent No. 2,341,739.

An object of the invention is to provide a method for forming cylindrical objects from powdered metal wherein the powdered metal is distributed into cylindrical form and, while being held in place centrifugally, is sintered for forming a porous metal cylinder.

A further object of the invention is to provide an apparatus for carrying out the above object.

Another object of the invention is to provide a method of centrifugally forming objects from powdered metal wherein sintering of the powdered metal is accomplished by the use of inductive heating.

Further objects and advantages of the present invention will be apparent from the following description, reference being had to the accompanying drawings wherein preferred embodiment of the present invention are clearly shown.

In the drawing:

Fig. 1 is a view in cross section showing the apparatus as the powdered metal is being filled therein.

Fig. 2 is a view in cross section showing the powdered metal being leveled off into a cylindrical form.

Fig. 3 is a view in cross section showing the heating element in place during the sintering of the powder.

Fig. 4 is a view of the cup which fits in the rotatable receptacle.

Fig. 5 is a view of the complementary cup which fits in the cup shown in Fig. 4.

Fig. 6 is a perspective of the rotatable receptacle.

Fig. 7 is a view showing a cylindrical part made by the apparatus shown.

Figure 8:
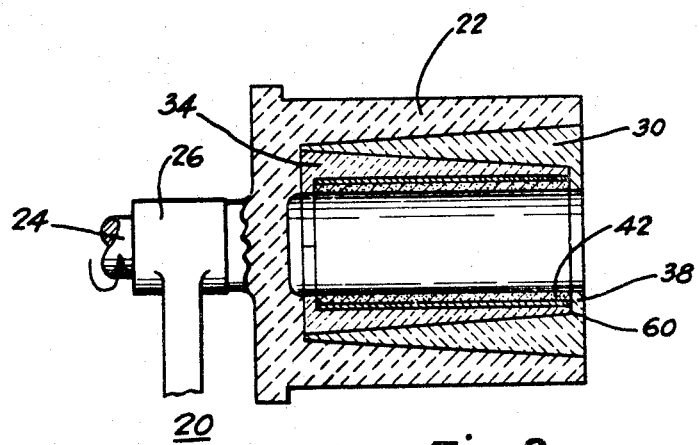
Fig. 8 is a view in cross section of the apparatus showing a composite bearing being formed therein.

When making objects from noncompacted metal powders it is necessary to provide molds into which the metal powder may be filled, which molds with the metal powder therein are heated under suitable conditions for sintering the metal powder. It has been found that when making cylindrical objects it is necessary to put draft on the core portions of the mold and on the wall portion of the mold so that the article may be removed therefrom after sintering, otherwise it is necessary to destroy the mold in order to remove the article therefrom.

The present invention is directed to a method and apparatus wherein cylindrical objects may be formed without the use of cores and wherein the apparatus utilized may be reused any number of times to form cylindrical articles of like shape and dimensions. The invention takes advantage of centrifugal force as a means for distributing the metal powder for molding it in place during sintering. To this end a rotating cylinder having a refractory lining is provided into which a charge of metal powder is placed. The charge may be inserted into the cylinder during rotation thereof or while the cylinder is stationary after which the receptacle is rotated to a speed sufficient to cause the metal powder to remain in place adjacent the wall of the cylinder. Next, the scraper is inserted and the metal powder is leveled off into a substantially uniform cylindrical layer. After the cylindrical layer has been formed the metal powder is heated under suitable conditions to sinter the same whereupon the porous metal article may be removed from the apparatus. In this manner no cores are required and no draft is required on any apparatus since, as will be described hereinafter, suitable mold cups are utilized which may be split to remove the cylindrical objects therefrom.

Referring to the drawings and particularly to Fig. 1, an apparatus 20 is shown which may be used in centrifugally forming cylindrical porous metal articles. Apparatus 20 comprises an outside receptacle 22 which has a shaft 24 extending therefrom. The shaft 24 is preferably journalled in a suitable bearing 26 and the shaft may be connected to motivating means, not shown, whereby the receptacle 22 may be rotated at any desired rate of speed. The walls 28 of cavity within receptacle 22 are tapered outwardly so that the diameter at the outer end of the receptacle is greater than the inner end thereof. Within this cavity is fitted a complementary tapered cup 30 which is preferably made in two pieces and which snugly fits against the walls 28 since the cup's outer walls are of a truncated conical shape complementing the shape of the cavity walls. The inner surface 32 of cup 30 is also of a truncated conical shape and is adapted to receive a split cup 34 made in two portions which are split longitudinally of the cup. The cup 34 has a cylindrical inner surface and a truncated conical outward surface 36 which is complementary to the inner surface 32 of cup 30, whereby the two portions of cup 34 may be assembled and slipped within the cup 30 and then the cup 30 may be slipped within the receptacle 22. The cup 30 and cup 34 include end flanges 38 and 40 respectively thereon which flanges preferably have the same inner diameter. Thus when the assembly is placed within the receptacle 22 as shown in Fig. 1, a cylindrical surface is presented which is adapted to receive metal powder 42 which is fed from a suitable dispenser 44. The powder is preferably fed into the apparatus while the receptacle 22 is rotated at a high rate of speed. After the dispenser 44 is removed from the apparatus, a scraper 46 is inserted therein and while resting on flanges 38 and 40 scrapes the powder into a substantially uniform cylindrical layer. If a measured quantity of powder has not been supplied to the apparatus excess powder may be scraped outwardly of the cup 34 by proper positioning of the apparatus. In any event, after the scraper 46 has completed its operation, a cylindrical layer of metal powder is apparent within the apparatus which is rotating at sufficiently high speeds to maintain the powder in place.

The receptacle portion of the apparatus is heated by suitable means, electrically or otherwise, to a temperature and for a time sufficient to cause the metal powder to sinter together into a porous metal layer. I prefer to use an inductive heating means 48 as shown in Fig. 3 which comprises a cup 50 having an induction heating coil 52 disposed around the inner surface thereof which coil and cup are adapted to fit over the outside of the rotating receptacle 22. At the axis of the cup 48, a tube 54 is provided through which a controlled atmosphere may be admitted to the cavity in which the powdered metal is being sintered. By using inductive heating, it is possible to get very rapid action in sintering, thereby reducing the time required for the operation. After the current is turned off, the controlled atmosphere can be admitted to the cavity for cooling purposes, after which the heating element 48 is removed and the cups 30 and 34 are taken out of the receptacle and disassembled for removing the cylindrical article therefrom. The cups and receptacle may be made from any suitable material such as heat resisting steels wherein the contacting surfaces are treated for preventing adhesion at the elevated temperatures. Similarly the cups may be made from refractory material such as graphite, ceramics or the like. If the inner cup 34 is removed and the inner wall 32 of cup 30 is made straight sided and provided with a bottom it is possible to make articles therein in cupped shapes which have a bottom wall with cylindrical or substantially cylindrical side walls. In this instance, it is preferred to have the cup 30 split so that the article can be removed therefrom without the necessity of draft. When desired, the inductive heating element may be inserted within the cup cavity so as to surround the tube 54. In this case, the tube must be made of a non-inductive material while the outer cups and receptacle may be made from heat resisting steel treated to prevent sticking.

It is apparent that pins, flutes, rings, etc., may be formed on the external walls of the cylinder or cup and likewise annular configuration may be formed on the internal walls by using a properly shaped leveling blade. Also when the term cylindrical is used in the appended claims it is used in a generic sense to include straight sided cylinder or cups, conical cups or any other shape possible to be made centrifugally.

Figures 9, 10:
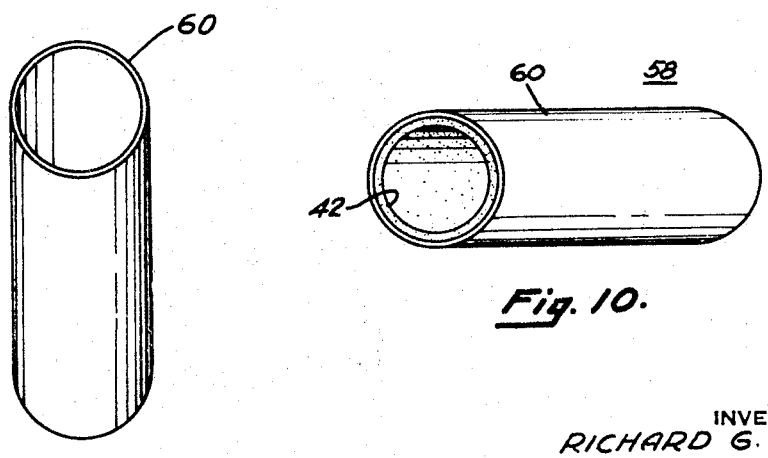
Fig. 9 is a view of a steel retaining shell.
Fig. 10 is a view of a composite bearing made in the apparatus and by the method disclosed.

Another use for the apparatus and method is in the fabrication of composite articles of cylindrical shape, for example, bushings having a reinforcing metal back may easily be made in the apparatus. One of these bushings 58 is shown in Fig. 10 wherein a steel shell or tube 60 is placed in the refractory receptacles 30 and 34 and then the metal powder 42 is distributed therein and is sintered as noted hereinbefore. During this sintering the powder coheres and forms a highly porous metal layer shown at 42 which is bonded metallurgically to the steel supporting back 60. The steel supporting back 60 may be clean steel or copper-plated steel or may be made from some other suitable metal, such as, nickel, Monel metal, copper and the like in accordance with the use of the bushing 58 and the constituency of the metal powder lining to be used. These bushings may next be sized as is well-known in the art by the passage of a burnishing punch therethrough which has the desired diameter. The punch will tend to compress the porous metal and form a body having a smooth bearing surface. After the formation of a composite bearing, the porous metal portion thereof may be impregnated with babbitt or lead as desired. This step may be carried out by the centrifugal method, wherein the molten impregnating metal is flowed onto the surface of the porous metal while the bearing is being rotated in the centrifuge.

While the embodiments of the present invention as herein disclosed, constitute preferred forms, it is to be understood that other forms might be adopted, all coming within the scope of the claims which follow.

What is claimed is as follows:

1. An apparatus for centrifugally forming highly porous metal cylinders and the like, comprising in combination: a receptacle which is adapted to be rotated and which has a truncated conical bore therein, a cup member adapted to fit into said receptacle and having a complementary truncated conical surface thereon and a truncated conical inside surface of opposite slope to said outside surface, said cup member being split axially thereof, a second cup member adapted to fit within the bore of the first cup member and having a truncated conical surface thereon complementary to the bore of the first cup member and having a bore therein with substantially parallel sides, said second cup member also being spit axially thereof whereby porous metal cylinders may be formed in said second cup member and then the entire assembly may be removed from said receptacle and the cup members split for effecting removal of the porous metal cylinder.

2. An apparatus for centrifugally forming highly porous metal cylinders and the like comprising in combination: a hollow receptacle adapted to be rotated at high speed, means for rotating the receptacle, a refractory cup member adapted to removably fit within said receptacle and to rotate therewith and having a flange at each end thereof extending inwardly a distance equal to the desired depth of metal powder, means for introducing a predetermined charge of metal powder into said cup member, means for leveling the metal powder into a uniform layer within said cup member while the cup member is rotating for forming a cylinder or the like of a predetermined wall thickness, said means extending at full length of the cup and being guided by said flanges, electrical heating means adapted to surround said receptacle and said cup member after said leveling means has been removed for sintering the metal powder as the receptacle and cup member are being rotated and means for introducing a non-oxidizing atmosphere into said cup member during said heating.

3. An apparatus as claimed in claim 2 wherein the cup member is split so that after the metal powder is sintered the cup member may be removed from the receptacle and split so that the porous metal article formed therein can be removed.

4. In the method of forming composite metal articles having a layer of metal powder bonded to a cylindrical steel support the steps comprising: providing a cylindrical steel support, centrifugally distributing a charge of metal powder into a substantially uniform layer in said support by axially rotating the support while introducing metal powder thereto, and then heating said layer and support while the layer is being held in place through rotation of said support by centrifugal force, said heating being accomplished under suitable conditions of time, temperature and atmosphere to cause the metal powder layer to sinter together into a porous metal layer and simultaneously to cause the porous metal layer to bond metallurgically to said support.

5. In the method of forming composite bearings including a layer of soft metal mechanically held and metallurgically bonded to a strong metal support backing through the medium of a sintered porous metal layer, the steps comprising: providing a cylindrical steel support, rotating the support at high speed, supplying a charge of metal powder to said support and distributing the powder thereagainst through centrifugal force into a uniform layer, heating the layer and the support while the layer is being held in place by centrifugal force, said heating being accomplished under suitable conditions of time, temperature and atmosphere to cause the metal powder to sinter together into a porous metal layer and bond simultaneously to said support, then introducing molten soft metal in predetermined quantities into said support while the support is being rotated for causing the molten metal to impregnate into the pores of the porous metal, and finally cooling under suitable conditions whereupon a composite bearing lined with a soft metal is provided.

RICHARD G. OLT.

REFERENCES CITED

The following references are of record in the file of this patent:

UNITED STATES PATENTS

| Number | Name | Date |
| --- | --- | --- |
| 359,483 | Whitley | Mar. 15, 1887 |
| 481,087 | Wilson, Sr. | Aug. 16, 1892 |
| 1,223,602 | Moir et al. | Apr. 24, 1917 |
| 1,321,125 | Pfanstiehl | Nov. 11, 1919 |
| 1,676,815 | Beatty | July 10, 1928 |
| 1,920,022 | Six | July 25, 1933 |
| 1,931,888 | Braddock | Oct. 24, 1933 |
| 1,958,109 | Morris | May 8, 1934 |
| 2,000,155 | White | May 7, 1935 |
| 2,027,963 | De Bats | Jan. 14, 1936 |
| 2,034,692 | Breitbart | Mar. 24, 1936 |
| 2,042,015 | Moormann | May 26, 1936 |
| 2,109,421 | Halkyard | Feb. 22, 1938 |
| 2,198,253 | Koehring | Apr. 23, 1940 |
| 2,240,971 | Wellman | May 6, 1941 |
| 2,253,003 | Whipple | Aug. 19, 1941 |
| 2,262,983 | Woods | Nov. 18, 1941 |
| 2,290,338 | Koehring | July 21, 1942 |
| 2,327,117 | Lorant | Aug. 17, 1943 |
| 2,341,739 | Olt | Feb. 15, 1944 |

FOREIGN PATENTS

| Number | Country | Date |
| --- | --- | --- |
| 311,931 | Germany | Apr. 29, 1919 |